United States Patent [19]

Austin et al.

[11] 4,046,721
[45] Sept. 6, 1977

[54] LOW FRIABILITY POLYISOCYANURATE FOAMS

[75] Inventors: Thomas H. Austin; George P. Speranza, both of Austin, Tex.

[73] Assignee: Texaco Development Corporation, New York, N.Y.

[21] Appl. No.: 709,984

[22] Filed: July 30, 1976

[51] Int. Cl.$^2$ .................. C08G 18/48; C08G 18/14
[52] U.S. Cl. .................. 260/2.5 AW; 260/2.5 AP
[58] Field of Search .................. 260/2.5 AP, 2.5 AW

[56] References Cited

U.S. PATENT DOCUMENTS

| | | | |
|---|---|---|---|
| 2,938,884 | 5/1960 | Chern | 260/58 |
| 3,207,710 | 9/1965 | Davis | 260/2.5 AP |
| 3,242,107 | 3/1966 | Bunge | 260/2.5 AP |
| 3,250,745 | 5/1966 | Davis | 260/2.5 AP |
| 3,497,465 | 2/1970 | Kujawa | 260/2.5 AP |
| 3,538,040 | 11/1970 | Grazen | 260/2.5 AP |
| 3,682,845 | 8/1972 | Longley | 260/2.5 AP |
| 3,686,101 | 8/1972 | Davis | 260/2.5 AP |
| 3,723,367 | 3/1973 | Chow | 160/2.5 AB |
| 3,728,293 | 4/1973 | Booth | 260/17.2 |
| 3,770,671 | 11/1973 | McFarling | 260/2.5 AP |
| 3,842,036 | 10/1974 | Chow | 260/2.5 AP |

FOREIGN PATENT DOCUMENTS

| | | | |
|---|---|---|---|
| 1,029,033 | 5/1966 | United Kingdom | 260/2.5 AP |

Primary Examiner—C. Warren Ivy
Attorney, Agent, or Firm—James L. Bailey; Carl G. Ries; Thomas H. Whaley

[57] ABSTRACT

Covers novel urethane-modified polyisocyanurate rigid foams comprising a reaction product obtained by bringing together in the presence of a blowing agent, an aromatic polyisocyanate, an isocyanurate group formation catalyst and a polyol comprising an alkylene oxide adduct of a novolak resin containing 5–25 weight percent of free phenol or substituted phenol based on the weight of said resin. Said foams are particularly characterized by their low friability, good flammability resistance and excellent thermal stability.

The novel foams are useful in preparing rigid foam materials, such as, panels, slabs or sprayed foam surfaces.

12 Claims, No Drawings

LOW FRIABILITY POLYISOCYANURATE FOAMS

BACKGROUND OF THE INVENTION

1. Field of the Invention

This invention pertains to the field of urethane-modified polyisocyanurate rigid foams. More particularly, this invention pertains to the use of specific polyols utilized in preparing said foams.

2. Description of the Prior Art

Urethane-modified polyisocyanurate rigid forms are known in the art. Such foams are prepared by reacting a polyol, polyisocyanate and optionally other ingredients in the presence of a blowing agent. An isocyanurate group formation catalyst is used to trimerize the isocyanate groups to form the isocyanurate linkages. The polyol essentially acts as a modifying or reactive plasticizing agent in the overall polymeric scheme since a polymer containing only isocyanurate groups is itself too friable. Thus, the isocyanurate foam contains both isocyanurate groups, as well as urethane linkages, with said urethane linkages acting to plasticize the foam. Initially, the reaction proceeds to give a urethane quasi-prepolymer containing active isocyanate groups which during the subsequent reaction time, trimerize to give the polymer rich in isocyanurate linkages. This sequence ultimately produces a urethane-modified polyisocyanurate polymer.

Some main uses of the resultant foam include those of thermal insulation, and as building materials and the like. Examples of some prior art, isocyanurate foams and methods of preparation are described in U.S. Pat. Nos. 3,745,133; 3,644,232; 3,676,380; 3,168,483; and 3,519,950 to name a few.

However, many known polyisocyanurates foams have one or more disadvantages. In particular, rigid foams of this type often have high friability or propensity to break. Efforts to reduce friability have often resulted in sacrifice of dimensional stability, and thermal stability and flammability resistance. Lack of flammability resistance is particularly characterized by flame spreadability. Yet other prior art polyisocyanurate foams have suffered from disadvantages of low adhesiveness, irregular cell structure and the like.

One class of polyols disclosed as being useful in preparing polyisocyanurates are novolak resins or derivatives of novolak resins, including, alkoxylated novolak resins. See, for example, U.S. Pat. Nos. 3,723,364; 3,723,367; 3,728,293; 3,745,133; 3,842,036; and 3,849,349. In each instance, the novolak resin is prepared by reacting an excess of phenolic compound such as phenol itself with an aldehyde such as formaldehyde. The excess aromatic phenol is then removed and the resin used as such or derivatized, such as by preparing an oxyalkylated phenol-aldehyde resin. However, it has been found here that such novolak polyols, while useful in preparing rigid polyisocyanurate foams, nevertheless, still do not have the requisite degree of low friability necessary for a commercial application.

We have now found that it is now possible to prepare modified polyisocyanurate foams involving use of specific novolak polyols that do not exhibit any of the aforesaid disadvantages. We have particularly found that urethane-modified polyisocyanurate foams can be prepared having suitable dimensional stability, low friability and good flammability resistance. Such are achieved without sacrifice of other sought-after properties such as thermal stability.

SUMMARY OF THE INVENTION

The present invention is an improved modified rigid polyisocyanurate foam comprised of the reaction product formed by bringing together in the presence of blowing agent, and an isocyanurate group formation catalyst, an aromatic polyisocyanate and a polyol comprising an alkylene oxide adduct of a novolak resin containing 5-25 weight percent of free phenol or substituted phenol based on the weight of said resin. The rigid foams exhibit suprisingly good dimensional stability, low friability, and good flammability resistance, as well as good thermal stability.

DETAILED DESCRIPTION OF THE INVENTION

The modified isocyanurate foams of the present invention in rigid foam form are prepared by mixing in the presence of a blowing agent an isocyanurate group formation catalyst, an aromatic polymer and a polyol comprising an alkylene oxide adduct of a novolak resin containing 5-25 weight percent of free phenol or substituted phenol based on the weight of said resin. The mixing is carried out under conventional foaming conditions utilizing conventional mixing devices employed in the manufacture of polymer foams. The procedure for mixing of the materials for the formation of the reaction product is not critical to the invention. Examples of conventional polymer foam formation processes and equipment are described in Ferrigno, "Rigid Plastic Foams", Reinhold Publishing Corporation, New York, N.Y., 1963.

In essence the novolak resin containing free phenol is subjected to alkoxylation whereby both the resin and free phenol are reacted with the alkylene oxide.

To provide the polyols described here, one first prepares a novolak resin. These phenol-aldehyde resins are polynuclear compounds having the structure:

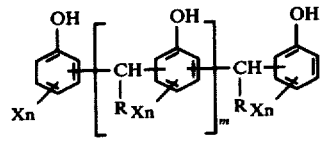

wherein R is hydrogen or an alkyl radical having from 1 to 3 carbon atoms, X is hydrogen, hydroxy, chlorine, bromine or an alkyl radical having from 1 to 12 carbon atoms, n is an integer from 1 to 2 and m is a integer from 0 to 4.

The novolak resins are prepared by condensing phenol or an ortho or para-substituted phenolic derivative thereof, such as cresol, xylenol, resorcinol, chlorophenol, bromophenol, isopropylphenol, t-butylphenol, octylphenol, nonylphenol, or dodecylphenol with an aldehyde in acidic solution and at a reaction temperature between about 60° and 160° C. The novolak resins may contain from two to six aromatic rings per molecular, but preferably contain an average of from 2.2 to 3.2 aromatic preferably, benzene rings.

The aldehydic reactant can be formaldehyde, acetaldehyde, propionaldehyde, or butyraldehyde, but is preferably formaldehyde, or a derivative, e.g. trioxane. Suitable acidic catalysts for the novolak resin reaction are oxalic acid, zinc acetate, hydrochloric acid, sulfuric acid or stannous octoate.

The reaction for making the novolak resins is carried out at the above temperature range and at atmospheric pressure or thereabouts, employing the phenol or phenolic derivative in amounts corresponding to from about 1.5 to about 3.0 moles of phenolic compounds per mole of aldehyde.

In the usual case, in order to derivatize a novolak resin or use it directly in some use such as a polyol source for polyurethane or polyisocyanurate foams, the novolak is first stripped of excess phenolic compound. It has been thought that it is necessary to strip off excess phenol in order to desirably increase the functionality and provide proper crosslinking. One would expect that by leaving present in the resin excess phenolic compound, overall functionality of the resin mixture would be undesirably lowered to give a product of two or lower functionality including monofunctional products, having unsuitable properties as a polyol for urethane resin formation or even other uses. However, it has been found that a suitable, and in fact greatly desirable polyol source for urethane-modified polyisocyanurate rigid foams may be prepared directly from a novolak resin containing excess phenol by leaving in the resin the excess of phenol and avoiding a separate stripping step. One thus achieves a considerable cost and time savings particularly in terms of time savings. In addition, it has been found that the friability of the resulting rigid polyisocyanurate foam is desirably low due to presence of a low functional polyol including monofunctional species, namely, excess phenolic compound hereafter alkoxylated, along with the novolak resin. As a still further advantage, the unstripped novolak resin polyols has a lower viscosity than the conventional stripped novolak resin polyols, resulting in easier handling. Lastly, due to the built-in-chain stopper, i.e., the low functional alkoxylated phenol, more isocyanurate linkages are allowed to be formed per chain in a desirable manner. Usually, presence of mono-functional compounds is avoided in cases of this type, due to undesirable chain-stopping. However, presence of such mono functional compounds can be tolerated, and in fact is desirable here because the final rigid polyisocyanurate polymer is cross-linked through the isocyanate group.

Greatly preferred novolak resins containing excess phenol or phenolic compound are those having a hydroxyl number ranging from about 180 to about 325.

The novolak resin containing excess phenol or phenolic compound is then condensed with alkylene oxide. Such procedures are well known to those skilled in the art, and such reaction is usually readily carried out in the presence of a suitable catalyst.

Preferred oxyalkylating agents comprise alkylene oxides having from 2 to 4 carbon atoms, and more preferable, the 1, 2-oxides having 2 to 3 carbon atoms, i.e., ethylene oxide and propylene oxide. Another useful agent of this type is trichlorobutylene oxide.

The oxyalkylated novolak products here are chemically tailored by the utilization of a specific alkylene oxide or mixtures thereof in various quantities. The hydroxyl number and viscosity of the final polyol product is determined by various factors, such as temperature of reaction, particular oxyalkylating agent used, its manner of addition to the reaction media, and quantities used. The alkylene oxide addition scheme is therefore somewhat emperical and depends upon factors such as the product desired, the alkylene oxide used, the type of addition, the order of addition, and the temperatures at which the alkylene oxides are added. For example, the alkylene oxide reagent can be added to the novolak resin containing excess phenol in either a heteric or a blocked manner or a combination thereof.

When blocked addition of the novolak resin containing excess phenol is sought, as an example, ethylene oxide may be first added, followed by addition of propylene oxide. Various addition methods yield products of the desired viscosity range with desirable hydroxyl numbers. As another example, heteric type addition can be employed whereby a mixture of ethylene oxide and propylene oxide is added. In such use, the relative concentrations of alkylene oxides can be changed. Thus, the relative concentration of ethylene oxide to propylene oxide may be varied in the mixture as the reaction progresses. For example, an ethylene oxide rich mixture may be initially metered into the reaction mixture. As the addition progresses, the relative concentration of propylene oxide may be increased. This can be accomplished with, for example, a valved mixing nozzle which is progressively regulated.

A greatly preferred polyoxyalkalene polyol comprising the alkoxylated adduct of a novolak resin containing excess phenol or phenolic compound is the ethylene oxide or propylene oxide of such mixture. Most preferable, the polyol utilized here is an ethylene oxide adduct, propylene oxide adduct or mixed ethylene oxide-propylene oxide adduct of novolak resin, plus excess phenol, prepared by reacting 1-4 moles of the alkoxylating agent per hydroxyl group of the novolak and the phenol.

It has been found here that the above described polyol is specifically tailored for use in rigid polyisocyanurate foams, and must be exactly constituted as directed to provide foams of desired and necessary physical properties. First, for example, if one does not alkoxylate the novolak resin containing excess phenol, a resultant rigid isocyanurate foam is obtained which is not sufficiently stable. On the other hand, foams prepared from the polyols described here have excellent dimensional stability and exhibit minimal volume, weight and linear changes. Again, the polyols here are so constituted to impart the proper amount of crosslinking to the rigid foams, and yet, have a proper overall functionality to provide desirable physical properties.

As used above, the hydroxyl number is defined as the number of milligrams of potassium hydroxide required for the complete neutralization of the hydrolysis product of the fully acetylated derivative prepared from one gram of polyol. The hydroxyl number can also be defined by the equation:

$$OH = 56.1 \times 1,000 \times F/MW$$

where

OH = hydroxyl number of the polyol

F = average functionality, that is the average number of hydroxyl groups per molecule of polyol.

MW = average molecular weight of the polyol.

Any aromatic polyisocyanate may be used in the practice of the instant invention. Typical aromatic polyisocyanates include m-phenylene diisocyanate, p-phenylene diisocyanate, polymethylene polyphenylisocyanate, 2, 4-tolylene diisocyanate, 2, 6-tolylene diisocyanate, dianisidine diisocyanate, bitolylene diisocyanate, naphthalene-1, 4-diisocyanate, diphenylene-4, 4'-diisocyanate, aliphatic-aromatic diisocyanates, such as xylylene-1, 4-diisocyanate, xylylene-1, 3-diisocyanates, bis(4-isocyanatophenyl)methane, bis(3-methyl-4-isocyanatophenyl)methane, and 4, 4'-diphenylpropane diisocyanate.

Greatly preferred aromatic polyisocyanates used in the practice of the invention are methylene-bridged polyphenyl polyisocyanate mixtures. These latter isocyanate compounds are generally produced by the phosgenation of corresponding methylene-bridged polyphenyl polyamines, which are conveniently produced by the reaction of formaldehyde and primary aromatic amines, such as aniline, in the presence of hydrochloric acid and/or other acidic catalysts. Known processes for preparing the methylene-bridged polyphenyl polyamines and corresponding methylene-bridged polyphenyl polyisocyanates therefrom are described in the literature and in many patents, for example, U.S. Pat. Nos. 2,683,730; 2,950,263; 3,012,008; 3,44,162 and 3,362,979.

Most preferred methylene-bridged polyphenyl polyisocyanate mixtures used here contain from about 20 to about 100 weight percent methylene diphenylisocyanate isomers with the remainder being polymethylene polyphenyl isocyanates having higher functionalities and higher molecular weights. Typical of these are polyphenyl polyisocyanate mixtures containing about 20 to 100 weight percent methylene diphenylisocyanate isomers, of which 2 to about 40 weight percent thereof is the 2, 4'-isomer, with the remainder being polymethylene polyphenyl polyisocyanates of higher molecular weight and functionality such that they have an average functionality of from about 2.1 to about 3.5. The isocyanate mixtures are known, commercially available materials and can be prepared by the process described in U.S. Pat. No. 3,362,979, issued Jan. 9, 1968, to Floyd E. Bentley.

Foaming is accomplished by employing in a minor amount (for example, from about 5 to 25 weight percent, based on total weight of the reaction mixture), of blowing agents which are vaporized by the exotherm of the isocyanatoreactive hydrogen reaction. The preferred blowing agents are certain halogen-substituted aliphatic hydrocarbons which have boiling points between about −40° C., and 70° C., and which vaporize at or below the temperature of the foaming mass. The blowing agents include, for example, trichloromonofluoromethane, dichlorodifluoromethane, dichloromonofluoromethane, dichloromethane, trichloromethane, bromotrifluoromethane, chlorodifluoromethane, chloromethane, 1, 1-dichloro-1-fluoroethane, 1, 1-difluoro-1, 2, 2-trichloro-ethane, 1, 1, 1-trichloro-2, 2, 2-trifluoroethane, 2-chloro, 1, 1, 1, 2, 3, 3, 4, 4, 4, -nonafluorobutane, hexafluorocyclobutane, and octofluorocyclobutane. Other useful blowing agents include water and low-boiling hydrocarbons such as butane, pentane, hexane, cyclohexane, and the like. Many other compounds easily volatilized by the exotherm of the isocyanate-reactive hydrogen reaction also can be employed. A further class of blowing agents includes the thermally unstable compounds which liberate gases upon heating, such as N, N'-dimethyl-N, N-dinitrosoterephthalamide.

The amount of blowing agent used will vary with the density desired in the foamed product. In general, it may be stated that for 100 grams of reaction mixture containing an average ratio of isocyanate group-reactive hydrogen of from about 1:1, to 20:1, about 0.05 to 0.3 mole of gas is used to provide densities ranging from 30 to 1 pound per cubic foot respectively.

The isocyanurate group formation catalyst or catalysts employed to promote trimerization may be chosen from a variety of known materials. Such catalysts include strong bases, alkali metal salts of carboxylic acids, nonbasic metal salts of carboxylic acids and aliphatic tertiary amines. For example, suitable strong bases include quaternary ammonium hydroxide, alkali metal hydroxide, and alkali metal alkoxides. Suitable alkali metal salts of carboxylic acids include, for example, sodium acetate, potassium octoate, potassium acetate, sodium benzoate, and the like. Examples of suitable tertiary amines are N, N'diethylpiperazine, N, N'-dimethylpiperazine, trialkylamines such as trimethylamine, triethylenediamine, tributylamine, 2, 4, 6-tris(dimethylaminopropyl)hexhydro-s-triazine, 2, 4, 6-tris-(dimethylaminomethyl)-phenol and the like. Mixtures of catalysts may also be employed.

The particular amount of catalyst employed can vary over a wide range and is not critical so long as it is present in an amount sufficient to promote trimerization of the isocyanate mixture. Preferably, the catalyst is added in an amount of about 0.0005 to about 0.025 equivalents for each equivalent of isocyanate employed. An optimum amount would be from about 0.001 to 0.01 equivalents per equivalent of isocyanate. Expressed in other terms, the catalyst or catalyst mixture is preferably added in an amount of from about 0.03 up to about 5.0 parts by weight, based upon the total foam formulation, i.e., 100 parts by weight.

Though not necessary, as will be seen hereafter, the isocyanurate foams of the invention can be formulated to include flame retardant components to improve the fire retardancy of the foams. Any known fire retardant component compatible with rigid isocyanurate foams can be employed. This would include both the reactive and additive type fire retardants. Representatives of the additive types include halogenated organic phosphates such as tris(chloroethyl) phosphate, tris(2, 3-dibromopropyl)phosphate, triphenyl phosphite, diammonium phosphate, and antimony oxide. Representatives of the chemically bound types are diethyl-N, N'-bis(2-hydroxyethyl)aminomethyl phosphonate, chlorendic acid derivatives, and phosphorous-containing polyols. When employed, the fire retardant component is added to the above-described isocyanate mixture with some other component or as preformed mixture with some other component described hereinbefore, in an amount of about 1 to about 20 weight percent of the total foam formulation.

Furthermore, fillers can be employed in the preparation of the isocyanurate foams, if desired in amounts within the range of about 0.1 to about 20 weight percent of the total foam formulation. Any conventional filler known in the art to be compatible with isocyanurate foam manufacture can be employed, such as hydrated alumina, polyethylene, aluminum powder, and various clays and talcs.

An emulsifier or stabilizing agent may also be used in the preparation of the isocyanurate foams of this invention including, for example, sulfonated castor oil or the like. One preferred foam stabilizer is that based on silicon such as, for example a polyoxyalkylene block copolymer of a silane. The latter type of silicon surfactant is disclosed in U.S. Pat. No. 2,834,748. Other surfactants or emulsifying or dispersing agents which may be used include ethylene oxide modified sorbitan, monopalmitate or ethylene oxide modified polypropylene ether glycol.

The amount of novolak polyether polyol employed in relation to the organic aromatic polyisocyanate is not critical, but preferably ranges in an amount of from about 0.05 to about 0.5 equivalents per equivalent of polyisocyanate. Optimally, about 0.1 to about 0.25 equivalents per equivalents of polyisocyanate is employed. Moreover, the polyol can be added to the polyisocyanate as a separate component or as a preformed mixture with one or more of the other components.

To prepare the isocyanurate foams of the invention, the above discussed ingredients may be simultaneously, or independently intimately mixed with each other by the so-called "one shot" method to provide a foam by a one-step process. Proportions of ingredients are properly adjusted to give rigid foams. In addition to the one shot method the "quasi-prepolymer method", may also be employed. Here, a portion of the polyol is reacted in the absence of a catalyst with the polyisocyanate component. Thereafter, to prepare a suitable foam, the remaining portion of the polyol is added and reaction allowed to go to completion in the presence of catalyst along with other appropriate additives such as blowing agents, foam stabilizing agents, fire retardants, etc.

Again, the isocyanurate foams of the present invention may be prepared over a wide range of temperatures. However, normally, the reaction is initiated at room temperature, and the only heat involved is that generated by the polymerization itself.

The invention will be illustrated further with respect to the following examples, which are given by way of illustration and not as limitation on the scope of this invention.

EXAMPLES I–XI

Here, preferred polyols of the invention were first prepared. A typical procedure for the preparation of these polyols is described below.

To a 15 gallon kettle was charged 28.2 pounds (0.30 pound moles) phenol. A condensation reaction catalyst, oxalic acid dihydrate in an amount of 115 grams was then added. Upon heating to 90° C., 37 percent aqueous formaldehyde was added (13 pounds, 0.16 pound moles) over a period of 15 minutes. The mixture was then digested at 100°–150° C. for 2 hours. Water was distilled from the mixture together with some phenol which carried over while the temperature was raised to 180° C. The remaining resin and phenol (28.75 pounds, 0.287 pound moles), was cooled to 80°–90° C., and an aqueous alkoxylation catalyst was added. After removing water, the mixture was heated to 140° C., and 16.6 pounds of propylene oxide (0.287 pound moles), was added and then digested to constant pressure. While holding the mixture at 140° C., ethylene oxide (12.6 pounds, 0.287 pound moles), was added and then digested to constant pressure. After neutralizing the alkoxylation catalyst, the product was recovered to yield 52.5 pounds. This product is designated polyol Number 9 in Table I below.

A number of other polyols of the invention were prepared which are listed in Table I below, as well as their characteristics and method of formation.

Polyols No. 4 and 5 represent extremes of free phenol content. Polyol No. 4 with a functionality of 3.4 has a free phenol content prior to alkoxylation of 7% while Polyol No. 5 with a functionality of 1.7 has a free phenol content of 25%.

TABLE I

| Polyol No. | Phenol lb-mole | Formaldehyde lb-mole | Product Resin lb-mole | PO lb-mole | EO lb-mole | Approximate Description | OH No. | Vis. cps, 25° C |
|---|---|---|---|---|---|---|---|---|
| 1. | 0.263 | 0.14 | — | — | 0.933 | 2.3 E · 3 EO | 229 | 2,850 |
| 2.(1) | (1) | (1) | 0.122 | 0.06 | — | 2.3 E · 3 EO · ½ PO | 197 | 2,720 |
| 3. | 0.263 | 0.13 | 0.255 | 0.255 | 0.590 | 2.2 E · 1 PO · 3½ EO | 207 | 3,550 |
| 4. | 0.263 | 0.175 | 0.233 | 0.233 | 0.515 | 3.4 E · 1 PO · 2¼ EO | 191 | 23,100 |
| 5. | 0.263 | 0.105 | 0.206 | 0.206 | 0.410 | 1.7 E · 1 PO · 1 EO | 234 | 1,250 |
| 6. | 0.263 | 0.154 | 0.256 | 0.256 | 0.522 | 2.9 E · 1 PO · 2 EO | 221 | 12,000 |
| 7. | 0.300 | 0.166 | 0.288 | 0.144 | 0.392 | 2.7 E · ½ PO · 1½ EO | 305 | 47,000 |
| 8. | 0.300 | 0.182 | 0.290 | 0.150 | 0.50 | 2.9 E · ½ PO · 1½ EO | 270 | 16,000 |
| 9. | 0.300 | 0.160 | 0.287 | 0.287 | 0.287 | 2.4 E · 1 PO · 1 EO | 278 | 18,000 |
| 10. | 0.480 | 0.300 | 0.465 | 0.465 | 0.470 | 3.2 E · 1 PO · 1 EO | 285 | 69,000 |
| 11. | 0.500 | 0.272 | 0.475 | 0.475 | 0.475 | 2.6 F · 1 PO · 1 EO | 280 | 26,000 |

¹Polyol prepared by capping Polyol No. 1 with ½ mole propylene oxide per hydroxy group.

EXAMPLES 12–39

In these examples, 600 g. handmix box pour foams were made to determine foaming behavior utilizing typical novolak polyols. A pre-blended B-component was combined with the isocyanate (A-component), stirred 2–3 seconds and poured. Stirring was accomplished with a drill press motor with an attached stirrer made by assembling one Conn mixer and two medium lift impellers on a steel shaft. The motor was operated at 4200 rpm.

The formulation of these rigid foams is shown below:

B-component

Polyol
DC-193 Silicone[1]
Potassium Octoate[2]
DMAPAT[3]
FYROL CEF[4]
R-11B[5]
A-Component
PAPI-901[6]

[1] Silicone-polyether; Dow Corning Corporation
[2] Potassium octoate was prepared from potassium hydroxide (1.0 mole) and 2-ethylhexanoic acid (1.1 mole) as a 50% solution in a propylene oxide adduct of glycerin, molecular weight 700; Jefferson Chemical Company, Inc.
[3] Tris [N,N-dimethyl-3-aminopropyl] sym hexahydro triazine.
[4] Tris (chloroethyl) phosphate; Stauffer Chemical Company. and Company.
[5] Trichloromonofluoromethane, E. I. duPont de Nemours and Company.
[6] Methylene-bridged polyphenyl polyisocyanate mixture obtained from Upjohn Company.

TABLE II

| Formulation, pbw. | 12 | 13 | 14 | 15 | 16 |
|---|---|---|---|---|---|
| B-Component | | | | | |
| Polyol No. 1 (Table I) | 21.2 | 21.2 | 20.9 | 21.3 | 21.0 |
| DC-193 | 0.5 | 0.5 | 0.5 | 0.5 | 0.5 |
| Potassium octoate | 1.0 | — | — | 0.5 | 0.5 |

TABLE II-continued

|  |  |  |  |  |  |
|---|---|---|---|---|---|
| DMAPAT | — | 2.5 | — | 1.0 | — |
| DMP-30[1] | — | — | 4.0 | — | 2.0 |
| FYROL CEF | 6.0 | 6.0 | 6.0 | 6.0 | 6.0 |
| R-11B | 12.0 | 12.0 | 12.0 | 12.0 | 12.0 |
| A-Component |  |  |  |  |  |
| PAPI-901 | 59.3 | 57.8 | 56.6 | 58.7 | 58.0 |
| Reactivity values, sec. |  |  |  |  |  |
| CT | 5 | 2 | 2 | 3 | 3 |
| RT | 35 | 60 | 120 | 27 | 38 |
| NCO/OH index | 5.0 | 5.0 | 5.0 | 5.0 | 5.0 |
| Foam Properties |  |  |  |  |  |
| Density, pcf | 2.17 | 1.91 | 1.98 | 2.09 | 2.03 |
| Closed Cells, % | 90.9 | 90.6 | 92.0 | 90.8 | 91.8 |
| K-Factor | .128 | .129 | .128 | .125 | .126 |
| Heat distortion, ° C. | >225 | 204 | 204 | 219 | 184 |
| Friability | 48 | 33 | 9 | 57 | 29 |
| Compressive strength |  |  |  |  |  |
| with rise, psi | 39 | 27 | 41 | 38 | 43 |
| cross rise, psi | 16 | 10 | 19 | 12 | 15 |
| Butler Chimney* |  |  |  |  |  |
| Wt. retained, % | 96.7 | 93.5 | 92.9 | 95.6 | 94.9 |
| Flame height, in. | 3.3 | 6.5 | 6.3 | 4.2 | 5.4 |
| Dimensional stability ΔV ΔW ΔL, 1 wk 158° F, 100% rel. hum. | 4-3 3 | 8-5 6 | 5 0 4 | 5-3 4 | 4-2 3 |

| Polyol No. | 2 | 2 | 2 | 2 | 2 | 2 | 3 | 3 | 3 | 3 | 3 | 3 |
|---|---|---|---|---|---|---|---|---|---|---|---|---|
| Formulation No., pbw. | 17 | 18 | 19 | 20 | 21 | 22 | 23 | 24 | 25 | 26 | 27 | 28 |
| B-Component |  |  |  |  |  |  |  |  |  |  |  |  |
| Polyol | 25.0 | 23.2 | 24.9 | 23.2 | 24.6 | 22.8 | 24.3 | 22.5 | 24.2 | 22.5 | 23.8 | 22.1 |
| DC-193 | 0.5 | 0.5 | 0.5 | 0.5 | 0.5 | 0.5 | 0.5 | 0.5 | 0.5 | 0.5 | 0.5 | 0.5 |
| Potassium octoate | 1.6 | 1.6 | 1.2 | 1.2 | 1.2 | 1.2 | 1.6 | 1.6 | 1.2 | 1.2 | 1.2 | 1.2 |
| DMAPAT | — | — | 1.2 | 1.2 | — | — | — | — | 1.2 | 1.2 | — | — |
| DMP-30 | — | — | — | — | 2.4 | 2.4 | — | — | — | — | 2.4 | 2.4 |
| FYROL CEF | — | 6.0 | — | 6.0 | — | 6.0 | — | 6.0 | — | 6.0 | — | 6.0 |
| R-11B | 12.0 | 12.0 | 12.0 | 12.0 | 12.0 | 12.0 | 12.0 | 12.0 | 12.0 | 12.0 | 12.0 | 12.0 |
| A-Component |  |  |  |  |  |  |  |  |  |  |  |  |
| PAPI-901 | 60.9 | 56.7 | 60.2 | 55.9 | 59.3 | 55.1 | 61.6 | 57.4 | 60.9 | 56.6 | 60.1 | 55.8 |
| NCO/OH index | 5.0 | 5.0 | 5.0 | 5.0 | 5.0 | 5.0 | 5.0 | 5.0 | 5.0 | 5.0 | 5.0 | 5.0 |
| Reactivity values |  |  |  |  |  |  |  |  |  |  |  |  |
| CT, sec. | 5 | 5 | 4 | 4 | 4 | 4 | 4 | 4 | 3 | 3 | 3 | 3 |
| RT, sec. | 30 | 31 | 21 | 22 | 30 | 25 | 30 | 29 | 20 | 22 | 30 | 31 |
| Foam Properties |  |  |  |  |  |  |  |  |  |  |  |  |
| Density, pcf | 2.38 | 2.22 | 2.40 | 2.29 | 2.15 | 2.16 | 2.29 | 2.24 | 2.21 | 2.21 | 2.11 | 2.08 |
| Closed cells, % | 91.7 | 92.8 | 91.7 | 91.5 | 92.4 | 91.1 | 92.6 | 92.2 | 91.6 | 96.5 | 92.2 | 90.5 |
| K-Factor | .127 | .110 | .125 | .109 | .120 | .117 | .120 | .113 | .139 | .118 | .115 | .123 |
| Heat distortion, ° C. | 207 | 208 | 218 | 170 | 211 | 203 | 224 | 192 | 218 | 210 | 216 | 200 |
| Friability, % | 47 | 25 | 32 | 16 | 12 | 14 | 28 | 30 | 16 | 18 | 17 | 15 |
| Compressive strength |  |  |  |  |  |  |  |  |  |  |  |  |
| With rise, psi | 45 | 37 | 45 | 38 | 39 | 39 | 41 | 37 | 32 | 39 | 37 | 37 |
| Cross rise, psi | 15 | 11 | 10 | 9 | 10 | 9 | 13 | 13 | 11 | 10 | 14 | 9 |
| Butler Chimney* |  |  |  |  |  |  |  |  |  |  |  |  |
| Wt. retained, % | 89.0 | 96.5 | 81.5 | 95.0 | 85.0 | 95.8 | 92.1 | 96.3 | 89 | 95.5 | 91.0 | 94.7 |
| Flame height, in. | >11 | 4.3 | >11 | 5.3 | >11 | 5.5 | 8.5 | 4.5 | >11 | 5.3 | >11 | 5.3 |
| Dimensional stability ΔV ΔW ΔL, 1 wk 158° F, 100% rel. hum. | 3 11 3 | 7 3 6 | 5-1 4 | 7-1 7 | 6-1 6 | 8 6 2 | 7 5 5 | 7 4 6 | 7-1 5 | 9 1 6 | 6 0 5 | 8 4 5 |

| Formulation, pbw. | 29 | 30 | 31 | 32 | 33 | 34 | 35 | 36 | 37 | 38 | 39 |
|---|---|---|---|---|---|---|---|---|---|---|---|
| Polyol No. 3 | 24.2 | 22.5 | 21.2 | 21.2 | 20.8 | 16.9 | 16.3 | 15.7 | 14.1 | 13.6 | 13.1 |
| DC-193 | 0.5 | 0.5 | 0.5 | 0.5 | 0.5 | 0.5 | 0.5 | 0.5 | 0.5 | 0.5 | 0.5 |
| Potassium octoate | 1.2 | 1.2 | 1.6 | 1.2 | 1.2 | 1.2 | 1.2 | 1.2 | 1.2 | 1.2 | 1.2 |
| DMAPAT | 1.2 | 1.2 | — | 1.2 | — | 1.2 | 1.2 | 1.2 | 1.2 | 1.2 | 1.2 |
| DMP-30 | — | — | — | — | 2.4 | — | — | — | — | — | — |
| Fyrol CEF | — | 6.0 | — | — | — | — | 3.0 | 6.0 | — | 3.0 | 6.0 |
| R-11B | 12.0 | 12.0 | 12.0 | 12.0 | 12.0 | 12.0 | 12.0 | 12.0 | 12.0 | 12.0 | 12.0 |
| PAPI-901 | 60.9 | 56.6 | 64.8 | 64.0 | 63.1 | 68.2 | 65.8 | 63.4 | 71.0 | 68.5 | 66.0 |
| NCO/OH index | 5.0 | 5.0 | 6.0 | 6.0 | 8.0 | 8.0 | 8.0 | 10.0 | 10.0 | 10.0 |  |
| Reactivity, sec. |  |  |  |  |  |  |  |  |  |  |  |
| CT | 3 | 3 | 4 | 3 | 3 | 3 | 3 | 3 | 3 | 3 | 3 |
| RT | 18 | 19 | 25 | 16 | 20 | 20 | 19 | 20 | 20 | 17 | 19 |
| Foam Properties |  |  |  |  |  |  |  |  |  |  |  |
| Density, pcf | 2.22 | 2.15 | 2.35 | 2.28 | 2.19 | 2.36 | 2.28 | 2.23 | 2.46 | 2.35 | 2.22 |
| Closed cells, % | 94.5 | 95.7 | 93.4 | 92.7 | 93.2 | 92.3 | 94.0 | 93.6 | 92.2 | 91.9 | 92.7 |
| K-Factor | .119 | .136 | .126 | .128 | .121 | .131 | .119 | .131 | .133 | .128 | .139 |
| Heat distortion, ° C | 207 | 213 | >225 | >225 | >225 | >225 | >225 | 204 | >225 | >225 | >216 |
| Friability, % | 16 | 20 | 42 | 29 | 21 | 42 | 48 | 39 | 61 | 51 | 56 |
| Compressive strength, |  |  |  |  |  |  |  |  |  |  |  |
| With 5-3 psi | 40 | 35 | 40 | 40 | 40 | 39 | 37 | 36 | 42 | 38 | 34 |
| Cross rise, psi | 13 | 10 | 15 | 15 | 14 | 15 | 13 | 12 | 15 | 15 | 14 |
| Butler Chimney* |  |  |  |  |  |  |  |  |  |  |  |
| Wt. retained, % | 93.0 | 95.7 | 95.0 | 93.6 | 93.9 | 93.8 | 95.9 | 96.2 | 94.4 | 96.0 | 95.8 |
| Flame height, in. | 7.5 | 4.5 | 5.3 | 6.3 | 6.7 | 7.3 | 4.0 | 4.5 | 5.9 | 3.7 | 4.3 |
| Dimensional stability, ΔV ΔW ΔL, 1 wk. 158° F, 100% rel. hum. | 7-3 6 | 7-5 6 | 3-2 3 | 5-3 4 | 4-2 4 | 5-3 4 | 5-4 4 | 4-5 4 | 5-4 5 | 4-4 3 | 3-5 3 |

[1] 2,4,6-tris-[dimethylaminomethyl] phenol, a product of Rohm and Haas.
*Numerical or other data from this test are not intended to reflect hazards presented by this or any other material under actual fire conditions. The data represents the behavior of the tested material under specific controlled test conditions.

EXAMPLES 40-48

Here runs were made by machine performed by conventional spray techniques utilizing a Gusmer spray machine to prepare the rigid foams. Both, A and B-components were pre-blended and charged to the machine. Then spray was applied in both single layer and multi-layer fashion for test purposes. The foams thus prepared had unifoam fine cells and good appearance. In addition, the thermal stability was excellent as shown by heat distortion and flammability resistance as evidenced by the Butler Chimney and Monsanto Tunnel values. The values in parenthesis in the Monsanto test represent the values obtained with a control standard foam. This foam was a Class I polyisocyanurate foam which was purchased commercially.

Results are given in Table III below.

TABLE III

| | 40 | | | 41 | | 42 | | 43 | | | 44 | |
|---|---|---|---|---|---|---|---|---|---|---|---|---|
| Polyol No. | 6 | | | 4 | | 3 | | 8 | | | 7 | |
| Formulation, pbw. | B | A | B | A | B | A | B | A | B | | A | |
| Polyol | 18.8 | | 19.5 | | 18.2 | | 20.1 | | 20.1 | | | |
| DC-193 | 0.5 | | 0.5 | | 0.5 | | 0.5 | | 0.5 | | | |
| Potassium octoate | 2.0 | | 2.0 | | 2.0 | | 1.8 | | 1.8 | | | |
| DMAPAT | 1.5 | | 1.5 | | 1.5 | | 1.8 | | 1.8 | | | |
| R-11B | 10.0 | 4.0 | 8.0 | 6.0 | 10.0 | 4.0 | 8.0 | 6.0 | 8.0 | | 6.0 | |
| FYROL CEF | | 6.0 | | 6.0 | | 6.0 | | 6.0 | | | 6.0 | |
| THANATE$^R$ P-270 | | 57.2 | | 56.5 | | 57.8 | | 55.8 | | | 55.8 | |
| NCO/OH index | | 5.6 | | 6.0 | | 6.2 | | 4.2 | | | 3.7 | |
| Machine Conditions | | | | | | | | | | | | |
| Pump size | 30 | 60 | 30 | 60 | 30 | 60 | 30 | 60 | 30 | | 60 | |
| Temp., ° F, block | 130 | | 130 | | 130 | | 144 | | 134 | | | |
| Line pressure, psi | 400 | 600 | 400 | 600 | 400 | 600 | 500 | 750 | 400 | | 800 | |
| Nozzle size | 55A | | 55A | | 55A | | | | | | | |
| Vis., cps, 25° C | 1200 | 100 | 485 | 76 | 190 | 110 | 1800 | 79 | 1400 | | 77 | |
| Sp. gravity, 25° C | 1.2231 | 1.2707 | 1.2061 | 1.2774 | 1.2131 | 1.2705 | 1.2034 | 1.2763 | 1.2021 | | 1.2773 | |
| Foam Properties | Single Layer | Multi-Layer | Single Layer | Multi-Layer | Single Layer | Multi-Layer | Single Layer | Multi-Layer | Single Layer | | Multi-Layer | |
| Density, pcf | 1.85 | 2.55 | 1.91 | 2.30 | 1.78 | 2.38 | 1.90 | 2.26 | 1.80 | | 2.38 | |
| Closed cells, % | 93.3 | 94.0 | 91.7 | 86.3 | 93.6 | — | 91.3 | 88.1 | 93.5 | | 89.8 | |
| K-Factor | .127 | .136 | .154 | — | .131 | .127 | .152 | .159 | .128 | | .162 | |
| Heat distortion, ° C | | >225 | | >225 | | >225 | | 221 | | | 218 | |
| Friability, % | | 8 | | 18 | | 11 | | 12 | | | 10 | |
| Compressive Strength | | | | | | | | | | | | |
| With rise, psi | | 24 | | 19 | | 26 | | 23 | | | 24 | |
| Cross rise, psi | | 16 | | 13 | | 17 | | 19 | | | 20 | |
| Butler Chimney* | | | | | | | | | | | | |
| Wt. retained, % | 94.9 | 96.4 | 94.6 | 95.0 | 95.5 | 95.4 | 94.5 | 96.0 | 94.3 | | 94.8 | |
| Flame height, in. | 4.4 | 4.8 | 4.8 | 5.2 | 4.4 | 3.9 | 4.9 | 4.8 | 4.8 | | 5.0 | |
| Dimensional stability ΔV ΔW ΔL, 1 wk. 159° F, 100% rel. hum. | 6 0 4 | 5 3 3 | 5 -4 2 | 2 -6 1 | 2 -6 1 | 4 1 2 | 3 -2 4 | 5 -3 4 | 6 1 3 | | 6 -1 4 | |
| Monsanto Tunnel** | | | | | | | | | | | | |
| Single layer | | | | | | | | | | | | |
| Flame spread | 47 (57) | | 56 (57) | | 38 (56) | | 57 (56) | | 48 (56) | | | |
| Wt. loss, % | 10.0 (12.1) | | 11.5 (12.1) | | 9.6 (11.6) | 11.4 (11.6) | | 10.4 (11.6) | | | | |
| Multi-layer | | | | | | | | | | | | |
| Flame spread | 49 (57) | | 56 (57) | | 42 (56) | | 54 (56) | | 62 (63) | | | |
| Wt. loss, % | 8.9 (12.1) | | 11.1 (12.1) | | 9.4 (11.6) | 11.5 (11.6) | | 10.9 (11.8) | | | | |

| | 45 | | | 46 | | 47 | | | 48 | |
|---|---|---|---|---|---|---|---|---|---|---|
| Polyol No. | 9 | | | 9 | | 9 | | | 9 | |
| Formulation, pbw. | B | A | B | A | B | A | B | | A | |
| Polyol | 14.0 | | 13.4 | | 1.39 | | 16.6 | | | |
| DC-193 | 0.5 | | 2.0 | | 0.5 | | 1.0 | | | |
| Potassium octoate | 2.0 | | 1.8 | | 1.5 | | 2.0 | | | |
| DMAPAT | 2.0 | | 1.8 | | 2.5 | | 2.0 | | | |
| R-11B | 14.0 | | 14.0 | | 14.0 | | 11.0 | | 3.0 | |
| FYROL CEF | | 6.0 | | 6.0 | | 6.0 | | | 6.0 | |
| THANATE$^R$ P-270 | | 61.5 | | 61.0 | | 61.6 | | | 58.4 | |
| NCO/OH index | | 6.2 | | 6.6 | | 6.2 | | | 5.0 | |
| Machine conditions | | | | | | | | | | |
| Pump size | 30 | 60 | 30 | 60 | 30 | 60 | 30 | | 60 | |
| Temp., ° F, block | | 104 | | 134 | | 130 | | | 128 | |
| Line pressure, psi | 400 | 800 | 400 | 800 | 400 | 800 | 400 | | 800 | |
| Nozzle size | | 55A | | 55A | | 55A | | | | |
| Vis., cps, 25° C | 180 | 180 | 160 | 190 | 130 | 200 | 350 | | 120 | |
| Sp.gravity, 25° C | 1.2493 | 1.2558 | 1.2480 | 1.2550 | 1.2488 | 1.2549 | 1.2642 | | 1.2638 | |
| Foam Properties | Single Layer | Multi-Layer | Single Layer | Multi-Layer | Single Layer | Multi-Layer | Single Layer | | Multi-Layer | |
| Density, pcf | 1.67 | 2.36 | 1.88 | 2.25 | 1.79 | 2.22 | 1.80 | | 2.26 | |
| Closed cells | 92.4 | 92.0 | 91.9 | 92.5 | 92.7 | 91.7 | 95.6 | | 93.4 | |
| K-Factor | .146 | .160 | .146 | .154 | .143 | .153 | .144 | | .146 | |
| Heat distortion, ° C | | >225 | | 209 | | >225 | | | 226 | |
| Friability, % | | 22 | | 18 | | 21 | | | 12 | |
| Compressive strength | | | | | | | | | | |
| With rise, psi | | 28 | | 30 | | 26 | | | 30 | |
| Cross rise, psi | | 19 | | 16 | | 20 | | | 16 | |
| Butler Chimney* | | | | | | | | | | |
| Wt. retained,% | 94.7 | 95.5 | 95.8 | 95.8 | 94.4 | 94.7 | 95.6 | | 95.0 | |
| Flame height, in. | 4.5 | 4.8 | 4.1 | 4.1 | 5.8 | 4.9 | 4.3 | | .4 0 | |
| Dimensional stability ΔV ΔW ΔL, 1 wk. 158° F, 100% rel. hum. | 4 -2 3 | 5 1 3 | 4 -1 4 | 5 -1 4 | 2 -11 3 | 4 -1 3 | 4 -1 3 | | 6 0 4 | |
| Monsanto Tunnel** Single Layer | | | | | | | | | | |

TABLE III-continued

| | | | |
|---|---|---|---|
| Flame spread | 43 (63) | 48 (63) | 50 (58) | 49 (58) |
| Wt. loss, % | 8.7 (11.8) | 9.8 (11.8) | 11.1 (12.6) | 19.4 (12.6) |
| Multi-Layer | | | | |
| Flame spread | 62 (63) | 47 (63) | 49 (58) | 52 (58) |
| Wt. loss, % | 10.8 (11.8) | 9.1 (11.8) | 10.0 (12.6) | 11.0 (12.6) |

[1]Polymeric isocyanate prepared by the condensation of aniline and formaldehyde in the presence of a solid acidic catalyst.
*Numerical or other data from this test are not intended to reflect hazards presented by this or any other material under actual fire conditions. The data represents the behavior of the tested material under specific controlled test conditions.
**This numerical flame sprread rating is not intended to reflect hazards presented by this or any other material under actual fire conditions.

spread

While the formulations described above were intended primarily for spray application, other types of application are possible utilizing the polyols here, including use as short rise laminated panels, slab stock foam, high rise molding, and pour-in place applications.

As can be seen from the above Examples, the polyols described here are uniquely tailored to provide rigid polyisocyanurate foams possessing high resistance to deformation and exposure to heat, low friability, low flame spreadability, low smoke evolution, excellent dimensional stability and other sought after properties.

We claim:

1. A urethane-modified polyisocyanurate rigid foam comprising a reaction product obtained by bringing together in the presence of a blowing agent, an aromatic polyisocyanurate, an isocyanurate group formation catalyst and a polyol comprising the addition product of a alkylene oxide to a mixture of a novolak resin and excess phenol or phenolic derivative wherein said phenol or phenolic derivative is present in an amount of 5-25 weight percent based on the weight of said resin.

2. The rigid foam of claim 1, wherein said novolak resin containing said excess phenol is prepared by reacting 1.5-3.0 moles of phenol per mole formaldehyde.

3. The rigid foam of claim 2, wherein said polyol has a hydroxyl number ranging from about 180 to about 325.

4. The rigid foam of claim 1, wherein said alkylene oxide is ethylene oxide.

5. The rigid foam of claim 1, wherein said alkylene oxide is propylene oxide.

6. The rigid foam of claim 1, wherein said alkylene oxide is a mixture of ethylene and propylene oxides.

7. A process for preparing a urethane-modified polyisocyanurate rigid foam comprising the steps of mixing and reacting in the presence of a blowing agent and an isocyanurate group formation catalyst, an aromatic polyisocyanate and a polyol comprising the addition product of an alkylene oxide to a mixture of a novolak resin and excess phenol or phenolic derivative wherein said phenol or phenolic derivative is present in an amount of 5-25 weight percent based on the weight of said resin.

8. The process of claim 7, wherein said novolak resin containing said excess phenol is prepared by reacting 1.5-3.0 moles of phenol per mole formaldehyde.

9. The process of claim 8, wherein said polyol has a hydroxyl number ranging from about 180 to about 325.

10. The process of claim 7, wherein said alkylene oxide is ethylene oxide.

11. The process of claim 7, wherein said alkylene oxide is propylene oxide.

12. The process of claim 7, wherein said alkylene oxide is a mixture of ethylene oxide and propylene oxides.

* * * * *